United States Patent [19]
Nishi et al.

[11] 3,780,992
[45] Dec. 25, 1973

[54] VIBRATING PIPETTE PROBE MIXER

[75] Inventors: Hiroshi H. Nishi; Charles McCarthy, both of Rockville, Md.

[73] Assignee: The United States of America as represented by the Secretary of the Department of Health, Education and Welfare, Washington, D.C.

[22] Filed: July 17, 1972

[21] Appl. No.: 272,144

[52] U.S. Cl. ............... 259/19, 73/425.4 P, 222/198, 222/200, 259/99
[51] Int. Cl. ........................ B01f 11/00, B01f 15/02
[58] Field of Search ................ 73/425.4 P; 259/1 R, 259/4, 19, 72, 27, 99, 113, DIG. 42, DIG. 43; 222/161, 198, 200, 202, 203; 23/259; 141/72

[56] References Cited
UNITED STATES PATENTS

| | | | |
|---|---|---|---|
| 2,732,099 | 1/1956 | Davis | 222/203 X |
| 3,476,518 | 11/1969 | Jungner | 73/425.4 P X |

OTHER PUBLICATIONS

Technilab Instruments, "Pipet Shaker", 1964.

*Primary Examiner*—Harvey C. Hornsby
*Assistant Examiner*—Alan I. Cantor
*Attorney*—Browdy and Neimark

[57] ABSTRACT

A vibrating pipette probe mixer is disclosed having means to vibrate the pipette so that when delivering extremely small quantities of liquid, accurate mixing and dispensing is achieved. The vibrating means may be either a mechanical vibrator attached to the pipette by a stiff wire or a fluidic oscillator attached to the pipette by opposing disc shaped diaphragms.

6 Claims, 4 Drawing Figures

PATENTED DEC 25 1973    3,780,992

VIBRATING PIPETTE PROBE MIXER

FIELD OF THE INVENTION

The present invention relates to a vibrating pipette probe mixer and more particularly to an apparatus for dispensing and mixing microliter quantities of solution for use in ultra-micro chemical analyses.

BACKGROUND OF THE INVENTION

Often in the fields of chemistry and medicine, it is necessary to deal with microliter quantities of solution. This is very important in blood analyses in infants and children, for example. When conducting such ultra-micro chemical analyses, the chemist or lab technician must utilize small vessels, for example those as small as several millimeters I.D. Furthermore, solutions must be mixed in very small proportions. It is very difficult to accurately dispense such microliter quantities of solution and it is furthermore difficult to achieve proper mixing of one solution which is added to another. These problems make automated analytical systems for ultra-micro chemical analyses impractical to achieve.

SUMMARY OF THE INVENTION

It is, accordingly, an object of the present invention to obviate the above-mentioned problems of the prior art. It is a further object of the present invention to provide a vibrating pipette probe mixer for the simultaneous dispensing and mixing of microliter quantities of solutions in one operation.

Briefly, the present invention consists of a pipette probe, preferably made of polyethylene or teflon tubing drawn to a fine tip, which is connected either directly or indirectly to a variable oscillating device. The pipette probe is connected to a source of solution by a flexible connector. The amplitude of the vibration to the probe is preferably adjustable to accommodate the amount of mixture and the size of the raction vessel for optimum mixing.

DESCRIPTION OF THE PREFERRED EMBODIMENTS

Figure 1:
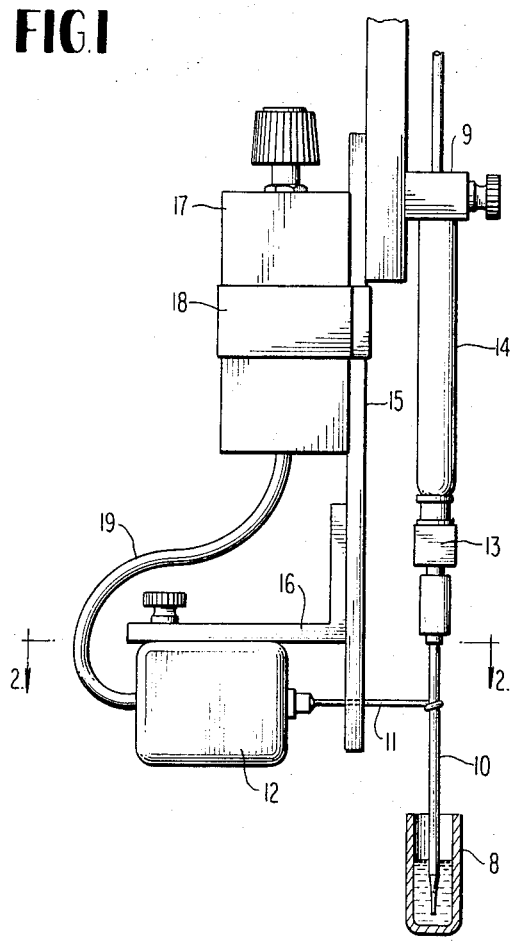
FIG. 1 is an elevational view of the vibrating pipette probe mixer in accordance with the present invention.
Figure 2:
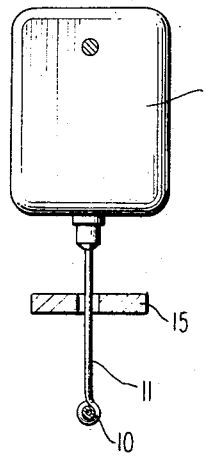
FIG. 2 is a plan view partly in cross section along line 2—2 of FIG. 1.

In FIGS. 1 and 2, pipette 10 is joined by a flexible connector 13 to a source of solution 14. The pipette is connected to and supported by support 15 by means of a bracket 9. The probe 10 is connected by means of a stiff wire 11 to a variable oscillating device 12. The wire 11 passes through an aperture in the support 15 and the oscillating device 12 is also supported by support 15 by means of suitable bracket 16. The variable oscillating device 12 may be a magnetic solenoid, an electronic rectifier, or any other suitable oscillating system. Preferably the amplitude of the oscillator should be variable and controllable. In FIG. 1, rheostat or potentiometer 17 is connected by wires 19 to oscillator 12. The rheostat 17 controls the amplitude of the oscillations of oscillator 12. The rheostat 17 is also suitably attached to support 15 as by bracket 18.

In operation, the entire system shown in FIG. 1 may be part of a larger automated chemical analytical system. The support 15 may be automatically controlled to carry the vibrating pipette 10 to a series of different reaction vessels 8 for adding microliter quantities of solutions to each reaction vessel while simultaneously mixing the liquids therein. The prescribed amounts of fluid leaving the pipette probe in a stream is dispersed into the liquid in the reaction vessel 8 by the action of the rapidly moving probe tip. The solution supply to the probe 10 may also be automatically controlled to dispense only predetermined amounts of solution. The outer lower surface of the probe 10 may be coated with silicone grease or some similar agent in order to create a hydrophobic effect thereon and thus keep any solution from clinging to the probe after removal from the reaction vessel 8. A 60 cycle frequency has been found to be suitable for the oscillator 12.

Figure 3:
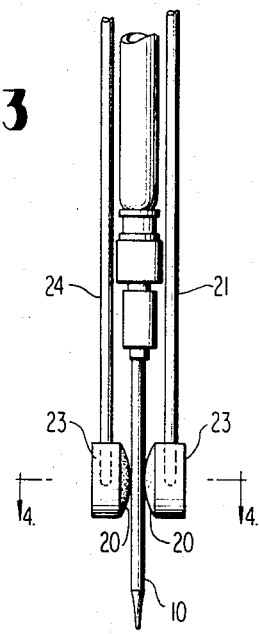
FIG. 3 is an elevational view of an alternate embodiment of the vibrating pipette probe mixer of the present invention.
Figure 4:
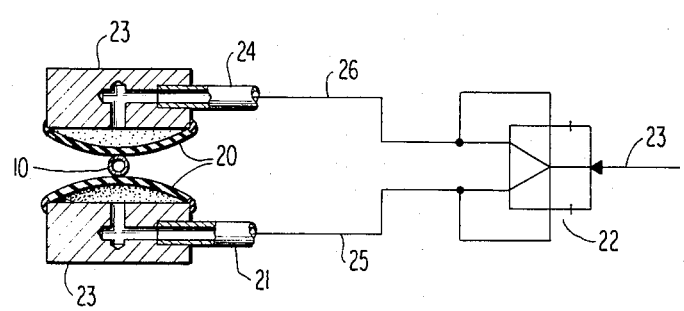
FIG. 4 is a sectional view partly in schematic form along line 4—4 of FIG. 3.

An alternate method of vibrating the pipette is shown in FIGS. 3 and 4. The pipette 10 passes between two disc shaped diaphragms 20 which are suitably attached as by rubber cement, for example, to supports 23. Supports 23 are connected to rigid tubes 21 and 24. Air pressure lines 25 and 26 pass through tubes 21 and 24 and supports 23 to communicate with the inside of diaphragms 20. The air pressure lines 25 and 26 are connected to a suitable astable fluidic oscillator 22 which is in turn connected to an air supply at 23. The air pressure is controlled by the oscillator 22 to alternate between the two lines 25 and 26 in order to alternately cause the inflation of each of the diaphragms 20. The alternation of the inflation of diaphragms 20 cause the pipette 10 to be vibrated.

The outstanding features of the vibrating pipette probe mixer are its ability to utilize small vessels, for example, those as small as several millimeters I.D., and to mix solutions in any proportion and order, e.g. 1 microliter into 300 microliters or 300 microliters into 1 microliter, without carryover of solution in successive dilutions.

It will be obvious to those skilled in the art that various changes may be made without departing from the scope of the invention and the invention is not to be considered limited to what is shown in the drawings and described in the specification.

What is claimed is:

1. In a pipette for dispensing microliter quantities of solution connected to a source of solution, the improvement comprising:
   vibrating means connected to said pipette for causing the oscillation of said pipette to achieve simultaneous dispensing and mixing of said microliter quantities of solution.

2. A pipette in accordance with claim 1 wherein:
   said vibrating means comprises a mechanical oscillating device and a stiff wire wherein said wire connects said pipette with said oscillating device.

3. A pipette in accordance with claim 2 wherein:
   said oscillating device comprises a magnetic solenoid or an electronic rectifier.

4. A pipette in accordance with claim 1 wherein said vibrating means comprises:
   air pressure lines; inflatable diaphragms connected to said air pressure lines and abutting said pipette on opposite sides thereof; and fluidic oscillator means for alternately supplying air pressure through said air pressure lines to cause inflation of each of said diaphragms, the alternate inflation of said diaphragms causing said pipette to be vibrated.

5. A pipette in accordance with claim 1 further including:

a flexible connector means for connecting said pipette with said source of solution.

6. A pipette in accordance with claim 1 wherein said vibrating means includes means for varying the amplitude of oscillation.

* * * * *